Sept. 20, 1966 A. S. BUDNICK 3,273,979

SEMICONDUCTIVE DEVICES

Filed July 6, 1964 2 Sheets-Sheet 1

INVENTOR.
ALFRED S. BUDNICK
BY
W. S. Hill
AGENT

Sept. 20, 1966 A. S. BUDNICK 3,273,979

SEMICONDUCTIVE DEVICES

Filed July 6, 1964 2 Sheets-Sheet 2

INVENTOR.
ALFRED S. BUDNICK
BY
W.S. Hill
AGENT

United States Patent Office 3,273,979
Patented Sept. 20, 1966

3,273,979
SEMICONDUCTIVE DEVICES
Alfred S. Budnick, New Providence, N.J., assignor to Radio Corporation of America, a corporation of Delaware
Filed July 6, 1964, Ser. No. 380,427
10 Claims. (Cl. 29—195)

Figure 5:
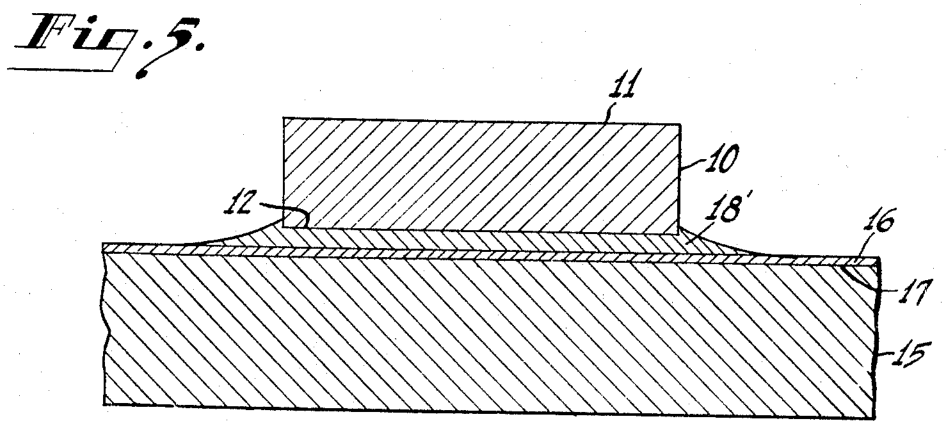

This invention relates to improved semiconductive devices, and improved methods of fabricating them. More particularly, the invention relates to improved methods of bonding crystalline semiconductive bodies to metallic bodies.

In the fabrication of semiconductive devices, it is desirable to mount the completed device on a support. For this purpose, the crystalline semiconductive die or wafer which forms the body of the device is bonded to a metallic body, which is known in the art as a "header." The metallic body serves as a mechanical support for the semiconductive body, which may, for example, consist of crystalline silicon. The metallic body may also serve as an electrical connection to the semiconductive body, and as a heat sink to remove heat generated in the semiconductive body during the operation of the device. The term "metallic" is used hereinafter and in the appended claims as generic to both single metals, and alloys of more than one metal. The bond formed between the semiconductive body and the metallic body should be sufficiently rugged to withstand adverse environmental conditions such as high temperatures, high humidity, and high accelerations. The bond should also have low electrical resistivity and high thermal conductivity.

Semiconductive bodies such as silicon dies have been bonded to metallic bodies by positioning a brazing preform between the two bodies and in direct contact with them, and heating the assemblage in a furnace to a temperature a little above the melting point of the preform. Preforms consisting of gold-germanium alloys have been utilized to furnace bond silicon dies that are about 35 to 60 mils square in area, i.e., 35 to 60 mils on a side, on the bonding face. However, it has been found that when smaller silicon dies are utilized, having a bonding face area 25 mils square or less, the prior art furnace mounting methods become unsatisfactory, and give poor yields, due to inadequate "wetting" of the small silicon die by the molten preform.

A general object of this invention is to provide an improved method of bonding semiconductive bodies to metallic bodies.

Another object of the invention is to provide an improved method of bonding silicon bodies to metallic bodies.

Still another object is to provide improved semiconductive devices.

But another object is to provide semiconductive devices having an improved rugged bond between crystalline silicon bodies and metallic bodies.

The foregoing and other objectives of the invention are accomplished by preparing a crystalline semiconductive body consisting of a silicon die having at least one major face with a layer consisting essentially of germanium thereon. A brazing preform is prepared consisting essentially of gold-germanium alloy. Advantageously, the area of the preform is greater than the area of the said major face of the silicon body or die. The preform is positioned on one major face of a metallic body, which serves as a support or header. The silicon die is positioned adjacent the preform so that the germanium layer on the die is in contact with the preform. The assemblage of the die, preform, and metallic body is heated to a temperature sufficient to bond said die to said body. If desired, the bonding of the silicon body to the metallic body may be facilitated by means of a layer of gold over that major face of the metallic body on which the preform is positioned, or by means of a film of gold on the germanium layer.

Figure 6:
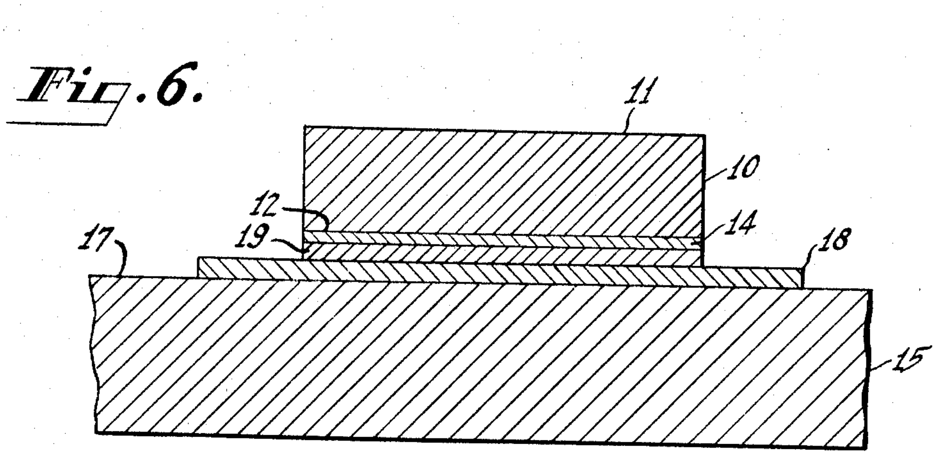
Figure 1:
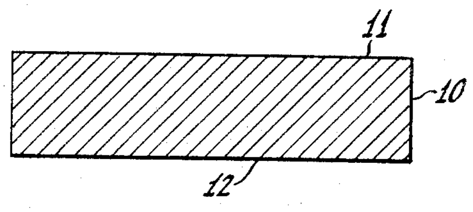
Figure 2:
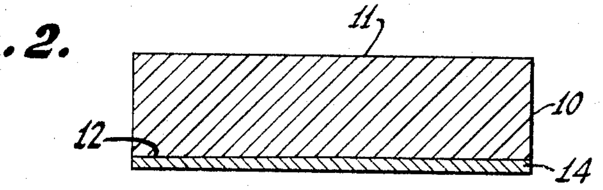
Figure 3:
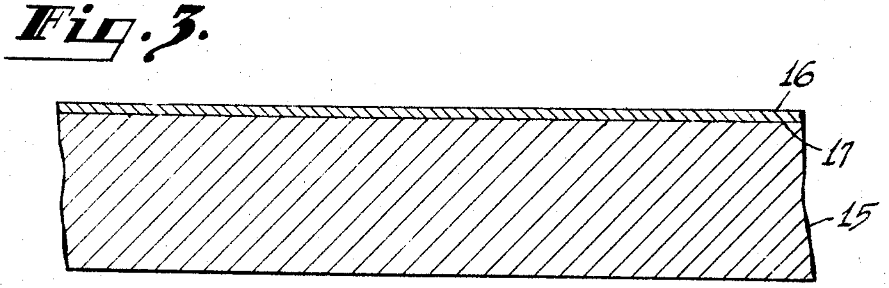
Figure 4:
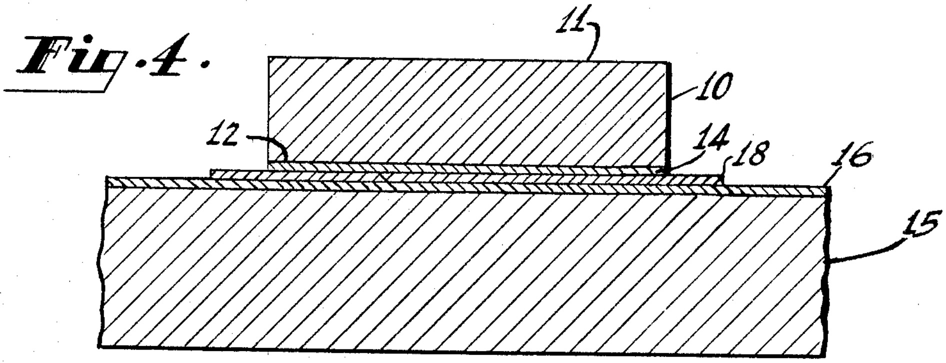

The invention and its features will be explained in greater detail by the following examples, considered in conjunction with the accompanying drawing, in which:

FIGURES 1–5 are cross-sectional, elevational views of a silicon body during successive steps in the fabrication of a semiconductive device according to an embodiment of the invention, and, FIGURE 6 is a cross-sectional, elevational view of a crystalline silicon body ready to be bonded to a metallic body according to another embodiment of the invention.

EXAMPLE I

In this example, the semiconductive body 10 (FIGURE 1) is a die of crystalline semiconductive silicon having two opposing major faces 11 and 12. The exact size, shape and conductivity type of semiconductive body 10 is not critical. In this example, the semiconductive body 10 is a die or wafer of monocrystalline N-type silicon about 16 mils square and 4 mils thick.

A layer 14 (FIGURE 2) consisting essentially of germanium is deposited by any convenient method on one major face 12 of semiconductive body 10. The germanium layer 14 may be quite thin, but the exact thickness of layer 14 is not critical. Suitably, germanium layer 14 is about 300 to 5000 Angstroms thick. Advantageously, the germanium layer 14 may include a small amount, of the order of a few percent by weight or less, of a substance which is a doping agent in silicon, and is capable of inducing the given conductivity type of the silicon body. In this example, the germanium layer 14 is deposited on face 12 of die 10 by evaporation, and sufficient antimony is co-evaporated at the same time so that the deposited germanium layer includes about 7 percent by weight antimony, the balance consisting essentially of germanium.

The semiconductive die 10 may include regions of opposite conductivity type, and p-n junctions between the opposite type regions and the given type bulk of the wafer. The die may also include a plurality of electrodes to the various regions of the die. In this example, the various possible arrangements of different conductivity regions, p-n junctions, and electrodes have been omitted for greater clarity.

A metallic body 15 (FIGURE 3) having at least one major face 17 is prepared as the support or header. The precise size, shape and composition of metallic body 15 is not critical, but the metallic body 15 should be substantially larger than the semiconductive die 10. In this example, the metallic body is a disc about 200 mils in diameter and about 10 mils thick. The body 15 may consist of a single metal such as nickel, molybdenum, or the like, or may consist of an alloy, such as the iron-nickel-cobalt alloys commercially available as "Fernico" or "Kovar." The body 15 may be uncoated, or may, as in this example, have a gold layer 16 on major face 17. The gold layer 16 may be deposited on face 17 by any convenient method, such as by evaporation, or plating, or the like.

A brazing preform 18 (FIGURE 4) is prepared from a low melting point alloy of gold and germanium. Advantageously, the composition of the alloy is about that of the gold-germanium eutectic, which is about 88 weight percent gold and 12 weight percent germanium. The precise size and shape of preform 17 is not critical but the area of preform 18 is preferably greater than the area of the silicon die 10. In this example, preform 18 is about 25 mils square and 1 mil thick. The preform 18 is positioned in contact with the gold layer 16 of metallic body 15, and the semiconductive body 10 is positioned on the preform 18 so that the germanium layer 14 is in contact with preform 18.

The assemblage is then heated to a temperature sufficient to bond the silicon die 10 to the header 15. The temperature utilized should be sufficient to melt the preform but insufficient to melt other components present. In this example, the assemblage is heated in a non-oxidizing ambient to about 400° C. to 500° C. for about 5 minutes. The non-oxidizing ambient may be a vacuum, or an inert gas such as nitrogen, argon, and the like, or a reducing gas such as hydrogen or forming gas. During this step, the preform 18 melts, and dissolves at least a portion of the germanium layer 14. For the temperature and preform of this example, practically all of the germanium layer 14 is dissolved, and a small amount of silicon from face 12 of the die may also be dissolved in the molten prefrom. On cooling the assemblage to room temperature, the melt freezes and forms a bonding layer 18′ (FIGURE 5) between face 12 of die 10 and face 17 of metallic body 15. The bonding layer 18′ consists essentially of gold and germanium, plus any conductivity modifier that was present in the germanium layer 14. In this example, the bonding layer 18′ includes the conductivity modifier (antimony) that was present in germanium layer 14. The concentration of antimony in the solidified bonding layer 18′ is considerably less than in the germanium layer 14, since bonding layer 18′ includes the mass of the preform 18.

The bond thus formed between silicon die 10 and metallic body 15 is mechanically strong, and exhibits good thermal and electrical conductivity. Moreover, it has been found that good wetting and bonding is obtained even with small silicon dies, as in this example. Thousands of assemblages may be bonded in a day by passing them through a single furnace. The method is thus particularly suitable for the mass production of silicon devices. In addition, it has been found that a large proportion of satisfactory bonds is obtained in this manner. The scrap rate is low, thus decreasing the unit cost of the product. The percentage of devices with satisfactory bonds, according to this embodiment, has been found to be as high as 96 to 98 percent.

EXAMPLE II

In this embodiment, the silicon die 10 (FIGURE 6) is provided with a germanium layer 14 on one major die face 12. As in the previous example, the germanium layer may contain a small amount of a substance which is a conductivity modifier in silicon. The conductivity modifier may be an acceptor such as boron, aluminum, gallium, and indium, or may be a donor such as phosphorus, arsenic and antimony. A thin gold film 19 is deposited over the doped germanium layer 14 by any convenient method, such as by evaporation or plating. The precise thickness of gold film 19 is not critical, and may be about 100 to 10,000 Angstroms.

A gold-germanium preform 18 is prepared as in Example I, with a composition close to that of the gold-germanium eutectic, and an area greater than the area of die face 12. The preform 18 is positioned on one major die face 17 of a metallic body 15. The silicon die 10 is positioned on preform 17 with major die face 12 down, so that the gold film 19 on the die is in contact with the preform 18. The assemblage is then heated as in Example I in an non-oxidizing ambient to a temperature sufficient to melt the preform 18 but not sufficient to injure the other components present. The molten preform dissolves the gold film 19 and the germanium layer 18. On cooling the assemblage to room temperature, the melt solidifies into a bonding layer consisting of gold, germanium, and any conductivity modifier present in the germanium layer.

The above examples are by way of illustration only, and not limitation. Other conductivity modifiers may be utilized instead of antimony. The gold layer or film may be deposited by other methods, such as by sputtering or by electroless plating. The conductivity modifier may be omitted from the germanium, and instead may be included in the gold layer on the metallic body or the gold film on the germanium layer. Alternatively, the modifier may be omitted completely. Various other modifications may be made without departing from the spirit and scope of the invention as set forth hereabove and in the appended claims.

What is claimed is:

1. The method of making a semiconductor device assemblage, comprising the steps of:
   - preparing a silicon die having at least one major face, and having a layer of germanium on said one major face;
   - positioning a gold-germanium alloy preform on a metallic body;
   - disposing said die and said preform with said germanium layer in contact with said preform; and,
   - heating the assemblage of said die, said preform, and said metallic body to a temperature sufficient to bond said die to said body.

2. The method of making a semiconductor device assemblage, comprising the steps of:
   - preparing a silicon die with at least one major face;
   - depositing a layer consisting essentially of germanium on said one major face of said silicon die;
   - preparing a preform consisting essentially of gold-germanium alloy;
   - positioning said preform on a metallic body;
   - positioning said silicon die on said preform so that said germanium layer on said die is in contact with said preform; and,
   - heating the assemblage of said die, said preform and said body to a temperature sufficient to bond said die to said body.

3. The method of making a semiconductor device assemblage, comprising the steps of:
   - preparing a silicon die with at least one major die face;
   - depositing a layer consisting essentially of germanium on said one major face of said silicon die;
   - depositing a film of gold on said germanium layer;
   - preparing a preform consisting essentially of gold-germanium alloy;
   - positioning said preform on a metallic body;
   - positioning said silicon die on said preform so that said gold film on said die is in contact with said preform; and,
   - heating the assemblage of said die, said preform and said body to a temperature sufficient to bond said die to said body.

4. The method of making a semiconductor device assemblage comprising the steps of:
   - preparing a silicon die with at least one major face;
   - depositing a layer consisting essentially of germanium on said one major face of said silicon die;
   - preparing a brazing preform consisting essentially of gold-germanium alloy;
   - preparing a metallic body with at least one major face and a layer of gold on said major face;
   - positioning said preform on said major face of said metallic body;
   - positioning said silicon die on said preform so that said germanium layer on said die is in contact with said preform; and,
   - heating the assemblage of said die, said preform, and said body to a temperature sufficient to bond said die to said body.

5. The method of making a semiconductor device assemblage comprising the steps of:
   - preparing a silicon die with at least one major face;
   - depositing a layer consisting essentially of germanium on one major face of said silicon die;

preparing a brazing preform consisting of about 88 weight percent gold—12 weight percent germanium alloy;

preparing a metallic body with at least one major face and a layer of gold on said major face;

positioning said preform on said gold layer on said metallic body;

positioning said silicon die on said preform so that said germanium layer on said die is in contact with said preform; and, heating the assemblage of said die, said preform, and said body in a non-oxidizing ambient to a temperature above the melting point of said preform but below the melting point of the other components present to bond said die to said body.

6. The method of making a semiconductor device assemblage comprising the steps of:

preparing a silicon die with at least one major face;

depositing a layer of germanium on one major face of said silicon die, said germanium layer containing a substance which is a conductivity modifier in silicon;

preparing a brazing preform consisting of 88 weight percent gold—12 weight perment germanium alloy;

preparing a metallic body with at least one major face and a layer of gold on said major face;

positioning said preform on said gold layer on said metallic body;

positioning said silicon die on said preform so that said germanium layer on said die is in contact with said preform; and, heating the assemblage of said die, said preform, and said body in a non-oxidizing ambient to a temperature above the melting point of said preform but below the melting point of the other components present to bond said die to said body.

7. A semiconductor device assemblage comprising:

a metallic body having at least one major face;

a silicon die having at least one major face;

a layer consisting essentially of germanium on said one major face of said die;

said silicon die being bonded to said metallic body by a layer of gold-germanium solder between said germanium layer on said die and said gold layer on said body.

8. A semiconductor device assemblage comprising:

a metallic body having at least one major face;

a silicon die having at least one major face;

a layer consisting essentially of germanium on said one major face of said die;

said silicon die being bonded to said metallic body by a layer of gold solder between said germanium layer on said die and said gold layer on said body.

9. A semiconductor device assemblage comprising:

a metallic body having at least one major face;

a layer of gold on said one major face of said body;

a silicon die having at least one major face;

a layer consisting essentially of germanium and a substance which is a conductivity modifier in silicon on said one major face of said die;

said silicon die being bonded to said metallic body by a layer of 88 weight percent gold—12 weight percent germanium solder between said germanium layer on said die and said gold layer on said body.

10. A semiconductor device assemblage comprising:

a metallic body having at least one major face;

a silicon die having at least one major face;

a layer consisting essentially of germanium and a substance which is a conductivity modifier in silicon on said one major face of said die;

a film of gold on said germanium layer;

said silicon die being bonded to said metallic body by a layer of 88 weight percent gold—12 weight percent germanium between said gold film on said die and said body.

No references cited.

HYLAND BIZOT, *Primary Examiner.*